United States Patent
Asthana et al.

(10) Patent No.: US 8,774,790 B2
(45) Date of Patent: Jul. 8, 2014

(54) METHOD AND APPARATUS FOR IMPROVING WIRELESS NETWORK RELIABILITY

(75) Inventors: Abhaya Asthana, Framingham, MA (US); Eric Bauer, Freehold, NJ (US); Peter Bosch, New Providence, NJ (US); Xuemei Zhang, Morganville, NJ (US)

(73) Assignee: Alcatel Lucent, Paris (FR)

(*) Notice: Subject to any disclaimer, the term of this patent is extended or adjusted under 35 U.S.C. 154(b) by 1014 days.

(21) Appl. No.: 11/354,709

(22) Filed: Feb. 15, 2006

(65) Prior Publication Data
US 2007/0190996 A1 Aug. 16, 2007

(51) Int. Cl.
*H04M 3/00* (2006.01)

(52) U.S. Cl.
USPC ........... 455/420; 455/418; 455/419; 455/445; 455/561; 455/7

(58) Field of Classification Search
USPC .......... 455/422.1, 423, 424, 561, 446, 425, 7, 455/8, 9, 10, 67.11, 67.13, 522, 418, 419, 455/420, 445
See application file for complete search history.

(56) References Cited

U.S. PATENT DOCUMENTS

| | | | |
|---|---|---|---|
| 6,768,719 B1* | 7/2004 | Couaillet | 370/242 |
| 6,795,606 B2* | 9/2004 | Dobler et al. | 385/24 |
| 2004/0077349 A1* | 4/2004 | Barak et al. | 455/436 |
| 2004/0235525 A1* | 11/2004 | Chater-Lea | 455/561 |
| 2005/0064820 A1* | 3/2005 | Park et al. | 455/67.11 |
| 2005/0188242 A1* | 8/2005 | Rabbat et al. | 714/4 |
| 2005/0255873 A1* | 11/2005 | Zhang et al. | 455/522 |
| 2006/0264214 A1* | 11/2006 | Stanwood et al. | 455/433 |

FOREIGN PATENT DOCUMENTS

GB 2280570 A * 1/1995 .............. H04Q 7/34

* cited by examiner

*Primary Examiner* — Olumide T Ajibade Akonai
(74) *Attorney, Agent, or Firm* — Wall & Tong, LLP (57) ABSTRACT

The invention includes a method and apparatus for reconfiguring a first base station element to attempt to serve at least a portion of the plurality of wireless terminals served by a second base station element in response to detection of a failure condition at a second base station element that was serving the plurality of wireless terminals prior to the occurrence of the failure condition.

20 Claims, 9 Drawing Sheets

METHOD AND APPARATUS FOR IMPROVING WIRELESS NETWORK RELIABILITY

FIELD OF THE INVENTION

The invention relates to the field of communication networks and, more specifically, to wireless communication networks.

BACKGROUND OF THE INVENTION

Base stations are typically the least reliable elements in wireless networks, and the portion of overall wireless service downtime attributable to base station failures is significant. First, since wireless service providers deploy numerous base stations in order to provide adequate wireless coverage, wireless service providers experience financial pressure to minimize base station cost, thereby discouraging redundant protection switching hardware. Second, many base stations are deployed in non-climate-controlled locations, including outdoor locations, thereby increasing base station hardware failure rates due to thermal and other environmental stresses. Finally, many base stations are deployed in remote, non-staffed locations, thereby increasing mean-time-to-repair (MTTR) times required for recovering from base station hardware failures due to the time required to bring repair personnel to the site.

Typically, when a base station fails, the wireless terminals served by the failed base station are expected to detect the failure and, if coverage is available from an adjacent base station, connect to that adjacent base station. In other words, the wireless terminals attempt to minimize the service disruption resulting from a base station failure. Although there is typically some degree of wireless service coverage overlap in wireless networks, many geographical regions may not be covered by multiple base stations, thereby preventing the wireless terminals from connecting to adjacent base stations. Furthermore, disadvantageously, existing wireless networks do not attempt to minimize the service disruption from a base station failure, relying instead on the reconnection actions initiated by the wireless terminals.

SUMMARY OF THE INVENTION

Various deficiencies associated with base station reliability are addressed by triggering a first base station element to attempt to reconfigure itself to be better able to serve at least a portion of a plurality of wireless terminals previously served by a second base station element than the first base station was able to prior to detection of an occurrence, on the second base station element, of a failure condition. More specifically, the first base station element attempts to take actions so as to reconfigure itself to be better able to serve at least a portion of the plurality of wireless terminals previously served by the second base station element than the first base station was able to prior to the occurrence of the failure condition on the second base station element. In one embodiment of the invention, either the first base station element or the second base station element may detect the occurrence of the failure condition on the second base station element.

One action that may be performed as part of the reconfiguration of a base station element is to increase a transmission power level employed by the first base station element so as to increase the wireless service coverage area of the first base station element to enable wireless terminals over a broader geographic area to be served by the reconfigured first base station element. Another action that may be performed as part of the reconfiguration of a base station element is reconfiguring the first base station element to monitor for the wireless terminals previously served by the second base station element on which the failure condition occurred. In one such embodiment, the direction in which each monitored wireless terminal is traveling is determined, and a connection is established between the reconfigured first base station element and each of the wireless terminals that is moving toward the reconfigured first base station element.

In one embodiment of the invention, in which the second base station element detects the occurrence of the failure condition, the second base station element may generate a failure indication message adapted for notifying the first base station element of the occurrence of the failure condition. The second base station element on which the failure condition is detected transmits the failure indication message to the first base station element either directly or indirectly, e.g., via a base station controller. Note that a base station element generally means a network element including wireline and wireless communication portions and may include, for example, a standard base station devoid of traffic routing elements, a base station router including traffic routing elements, and like network elements including wireline and wireless communication portions.

BRIEF DESCRIPTION OF THE DRAWINGS

To facilitate understanding, identical reference numerals have been used, where possible, to designate identical elements common to the figures.

DETAILED DESCRIPTION OF THE INVENTION

The present invention enables reconfiguration of one or more base station elements in response to failure conditions detected at one or more other base station elements. The present invention, by rapidly detecting failure conditions at base station elements, enables reconfiguration of adjacent base station elements in a manner for maintaining continuity of service for one or more wireless terminals (i.e., wireless devices) served by the base station elements for which the failure conditions are detected. The present invention, by complementing existing wireless terminal failover capabilities with a self-healing network which proactively responds to base station element failures, thereby improves overall end-to-end service availability.

Figure 1:
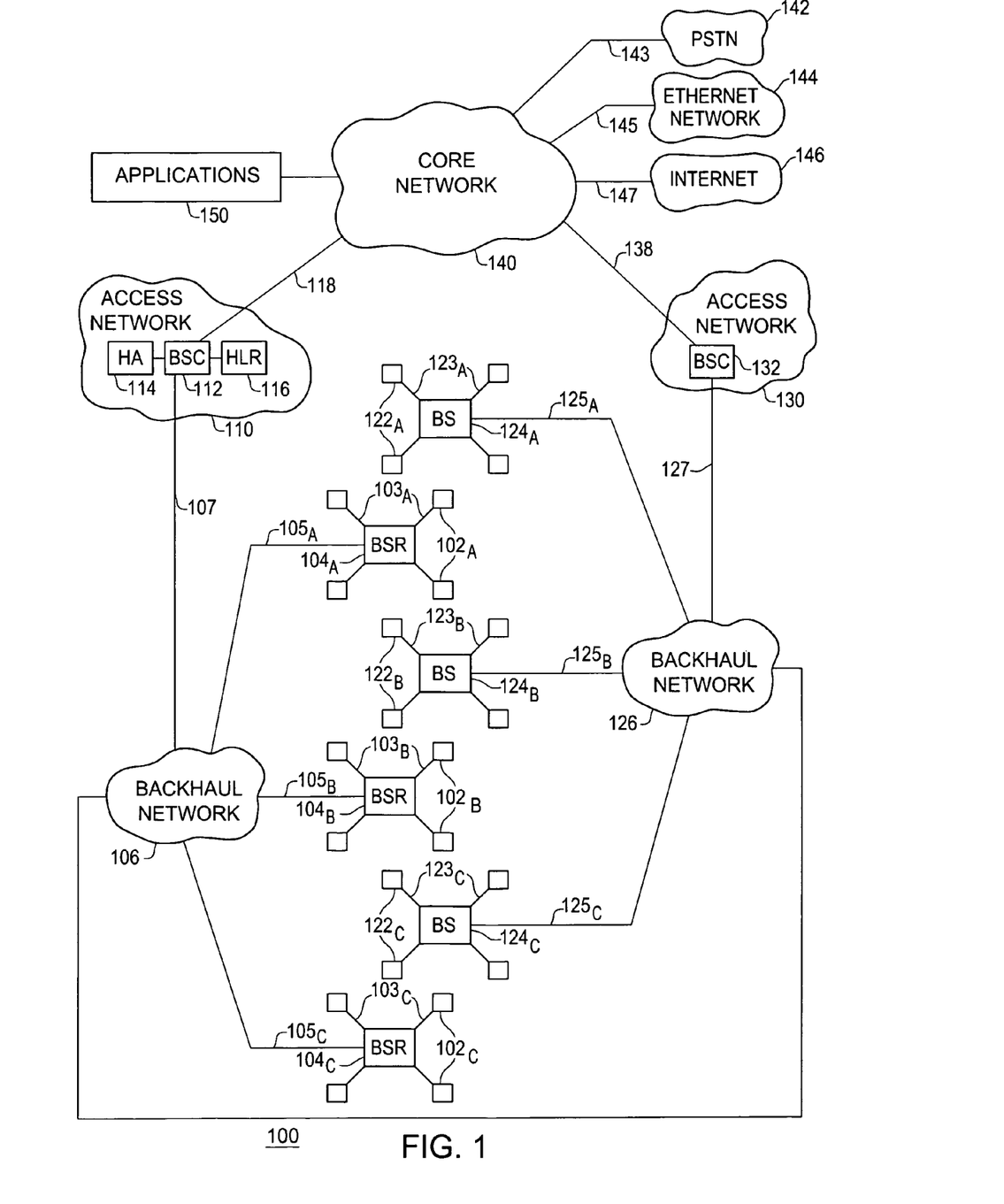
FIG. 1 depicts a high-level block diagram of a communications network.

FIG. 1 depicts a high-level block diagram of a communications network. As depicted in FIG. 1, communications network (CN) 100 includes a communications network portion having a plurality of base station routers supporting respective pluralities of wireless terminals and a second network portion having a plurality of base stations supporting respective pluralities of wireless terminals. The communication network portion including the base station routers is supported by the communication network portion including base stations. The base station routers and base stations may be collectively referred to as base station elements (i.e., an element adapted for supporting wireless communications (e.g., radio frequency) with wireless terminals).

As depicted in FIG. 1, CN 100 includes a plurality of wireless terminals (WTs) $102_{A1}$-$102_{A4}$ (collectively, WTs $102_A$) in communication with a base station router (BSR) $104_A$ using a plurality of wireless communication links (WCLs) $103_{A1}$-$103_{A4}$ (collectively, WCLs $103_A$), a plurality of wireless terminals (WTs) $102_{B1}$-$102_{B4}$ (collectively, WTs $102_B$) in communication with a base station router (BSR) $104_B$ using a plurality of wireless communication links (WCLs) $103_{B1}$-$103_{B4}$ (collectively, WCLs $103_B$), a plurality of wireless terminals (WTs) $102_{C1}$-$102_{C4}$ (collectively, WTs $102_C$) in communication with a base station router (BSR) $104_C$ using a plurality of wireless communication links (WCLs) $103_{C1}$-$103_{C4}$ (collectively, WCLs $103_C$), a backhaul network (BN) 106, and an access network (AN) 110. The WTs $102_A$-$102_C$ are collectively referred to as WTs 102, BSRs $104_A$-$104_C$ are collectively referred to as BSRs 104, and WCLs $103_A$-$103_C$ are collectively referred to as WCLs 103. The WTs 102 may be referred to as wireless terminals.

As depicted in FIG. 1, BSRs $104_A$-$104_C$ communicate with BN 106 using a plurality of communication links (CLs) $105_A$-$105_C$ (collectively, CLs 105). As depicted in FIG. 1, BN 106 is a network adapted for transporting traffic between BSRs 104 and AN 110. In one embodiment, BN 106 is an IP-based network. The BN 106 communicates with AN 110 using a communication link (CL) 107. As depicted in FIG. 1, AN 110 is a network adapted for transporting traffic between BN 106 and CN 140. In one embodiment, AN 110 is an IP-based network. The AN 110 includes a base station controller (BSC) 112, a home agent (HA) 114, and a home location register (HLR) 116. The BN 106 communicates with BSC 112 using CL 107. The HA 114 and HLR 116 communicate with BSC 112. As depicted in FIG. 1, WTs 102, BSRs 104, BN 106, and AN 110 are collectively referred to as a BSR-based network portion.

As depicted in FIG. 1, CN 100 includes a plurality of wireless terminals (WTs) $122_{A1}$-$122_{A4}$ (collectively, WTs $122_A$) in communication with a base station (BS) $124_A$ using a plurality of wireless communication links (WCLs) $123_{A1}$-$123_{A4}$ (collectively, WCLs $123_A$), a plurality of wireless terminals (WTs) $122_{B1}$-$122_{B4}$ (collectively, WTs $122_B$) in communication with a base station (BS) $124_B$ using a plurality of wireless communication links (WCLs) $123_{B1}$-$123_{B4}$ (collectively, WCLs $123_B$), a plurality of wireless terminals (WTs) $122_{C1}$-$122_{C4}$ (collectively, WTs $122_C$) in communication with a base station (BS) $124_C$ using a plurality of wireless communication links (WCLs) $123_{C1}$-$123_{C4}$ (collectively, WCLs $123_C$), a backhaul network (BN) 126, and an access network (AN) 130. The WTs $122_A$-$122_C$ are collectively referred to as WTs 122, BSs $124_A$-$124_C$ are collectively referred to as BSs 124, and WCLs $123_A$-$123_C$ are collectively referred to as WCLs 123.

As depicted in FIG. 1, BSs $124_A$-$124_C$ communicate with BN 126 using a plurality of communication links (CLs) $125_A$-$125_C$ (collectively, CLs 125). As depicted in FIG. 1, BN 126 is a network adapted for transporting traffic between BSs 124 and AN 130. In one embodiment, BN 126 is an IP-based network. The BN 126 communicates with AN 130 using a communication link (CL) 127. As depicted in FIG. 1, AN 130 is a network adapted for transporting traffic between BN 126 and CN 140. In one embodiment, AN 110 is an IP-based network. The AN 130 includes a base station controller (BSC) 132. The BN 126 communicates with BSC 132 using CL 127. As depicted in FIG. 1, WTs 122, BSs 124, BN 126, and AN 130 are collectively referred to as a BS-based network portion.

As depicted in FIG. 1, AN 110 and AN 130 communicate with a core network (CN) 140. The CN 140 is an IP-based network adapted for supporting communications with ANs 110 and 130. The CN 140 is coupled to a public switched telephone network (PSTN) 142 using a communication link (CL) 143, an Ethernet network (EN) 144 using a communication link (CL) 144, and the Internet 146 using a communication link 147. The CN 140 is coupled to applications 150 using communication link 152. As such, WTs 102 and WTs 122 may communicate with various other user terminals associated with CN 140 and associated with PSTN 142, EN 144, and ONs 146 associated with CN 140, and may access applications 150 using CN 140.

Although, for purposes of clarity, BNs 106 and 126 and CN 140 are not depicted as comprising specific network elements, those skilled in the art will appreciate that BNs 106 and 126 and CN 140 may include various combinations of network element. Although depicted as comprising BSC 112, HA 114, and HLR 116 and BSC 132, respectively, those skilled in the art will appreciate that AN 110 and AN 130, may include fewer or more network elements. For example, in one embodiment, depending upon the network type, ANs 110 and 130 may include various combinations of mobile switching centers (MSCs), visitor location registers (VLRs), radio network controllers (RNCs), serving GPRS support nodes (SGSNs), gateway GPRS support nodes (GGSNs), gateway MSCs (GMSCs), and like network elements as known in the art. For example, at least a portion of the network elements deployed in a GPRS network may differ from at least a portion of the network elements deployed in a UMTS network.

As depicted in FIG. 1, WTs 102 and WTs 122 include wireless terminals operable for capturing and transmitting information and receiving and presenting information. The WTs 102 and WTs 122 include wireless terminals operable for communicating with other wireless terminals, receiving network-based content (e.g., audio content, video content, and the like), and the like), presenting content to at least one user (e.g., playing received audio content, displaying streaming video content, and the like), and performing like functions. The WTs 102 and WTs 122 capture information using keyboards, microphones, video recorders, and like information capture components and present information using speakers, displays, and like information presentation modules. For example, WTs 102 and WTs 122 include mobile phones, wireless-enabled computers, and like wireless terminals.

As depicted in FIG. 1, BSRs 104 and BSs 124 are adapted for supporting wireless communications with wireless terminals (illustratively, WTs 102 and WTs 122, respectively). The BSRs 104 include wireless communication modules for communicating with WTs 102, wireline communications modules for communicating with BN 106, packetization-depacketization modules for wireless-to-wireline conversion and wireline-to-wireless conversions, respectively, and packet routing modules for routing data packets, management packets, and the like. The BSs 124 include wireless communication modules for communicating with WTs 122, wireline communications modules for communicating with BN 126, and packetization-depacketization modules for wireless-to-wireline conversions and wireline-to-wireless conversions, respectively.

The WTs 102, BSRs 104, BN 106, and AN 110 are collectively referred to as a BSR-based network portion. Since BSRs 104 include packet routing functionality, the BSR-based network portion may be used in conjunction with a General Packet Radio Service (GPRS) wireless network, a Global System for Mobile (GSM) wireless network, a Third Generation (3G) wireless network (e.g., a Wideband Code Division Multiple Access (WCDMA) wireless network, a Universal Mobile Telecommunications System (UMTS) wireless network, a CDMA2000 wireless network, and the like), a Fourth Generation (4G) wireless network, and like wireless networks, as well as various combinations thereof. The WTs 102, BSRs 104, BN 106, and AN 110 may vary depending upon the wireless network implementation, as well as the network configurations of associated communication networks.

The WTs 122, BSs 124, BN 126, and AN 130 are collectively referred to as a BS-based network portion. Since the BS-based network portion may be implemented as a General Packet Radio Service (GPRS) wireless network, a Global System for Mobile (GSM) wireless network, a Third Generation (3G) wireless network (e.g., a Wideband Code Division Multiple Access (WCDMA) wireless network, a Universal Mobile Telecommunications System (UMTS) wireless network, a CDMA2000 wireless network, and the like), a Fourth Generation (4G) wireless network, and like wireless networks, as well as various combinations thereof, WTs 122, BSs 124, BN 126, and AN 130 may vary depending upon the wireless network implementation, as well as the network configurations of associated communication networks.

Figure 2:
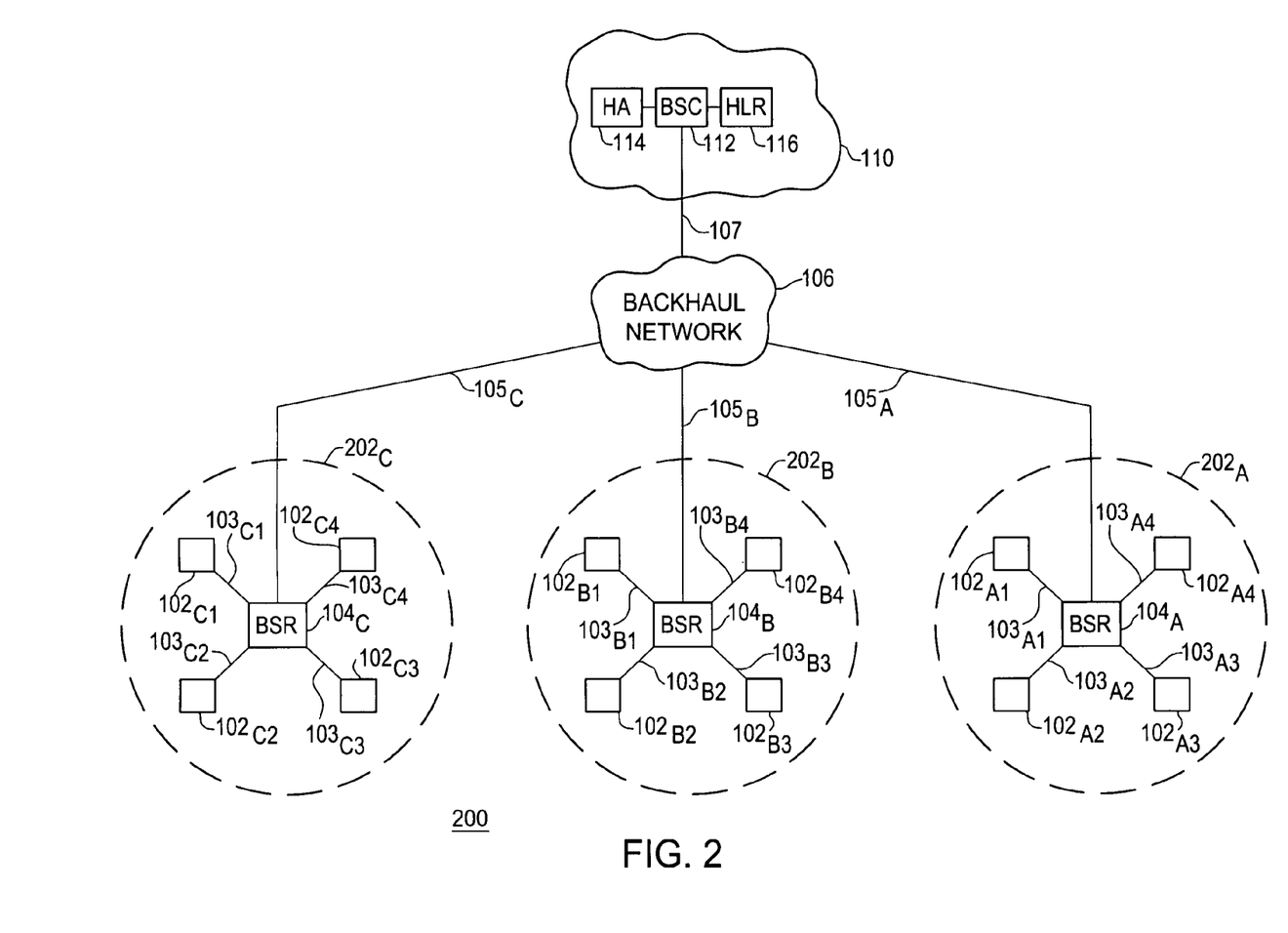
FIG. 2 depicts a high-level block diagram of a BSR-based portion of the communications network of FIG. 1 before a failure condition.

FIG. 2 depicts a high-level block diagram of a BSR-based portion of the communications network of FIG. 1 before a failure condition. Specifically, BSR-based portion 200 of FIG. 2 includes WTs 102, BSRs 104, BN 106, and AN 110. As depicted in FIG. 2, BSRs $104_A$-$104_C$ have an associated plurality of wireless service coverage areas (WSCAs) $202_A$-$202_C$ (collectively, WSCAs 202), respectively. As depicted in FIG. 2, WTs $102_A$ located within WSCA $202_A$ are served by BSR $104_A$, WTs $102_B$ located within WSCA $202_B$ are served by BSR $104_B$, and WTs $102_C$ located within WSCA $202_C$ are served by BSR $104_C$. In one embodiment of the present invention, BSRs 104 may be reconfigured in response to failure conditions associated with BSRs 104, as depicted and described with respect to FIG. 3.

Figure 3:
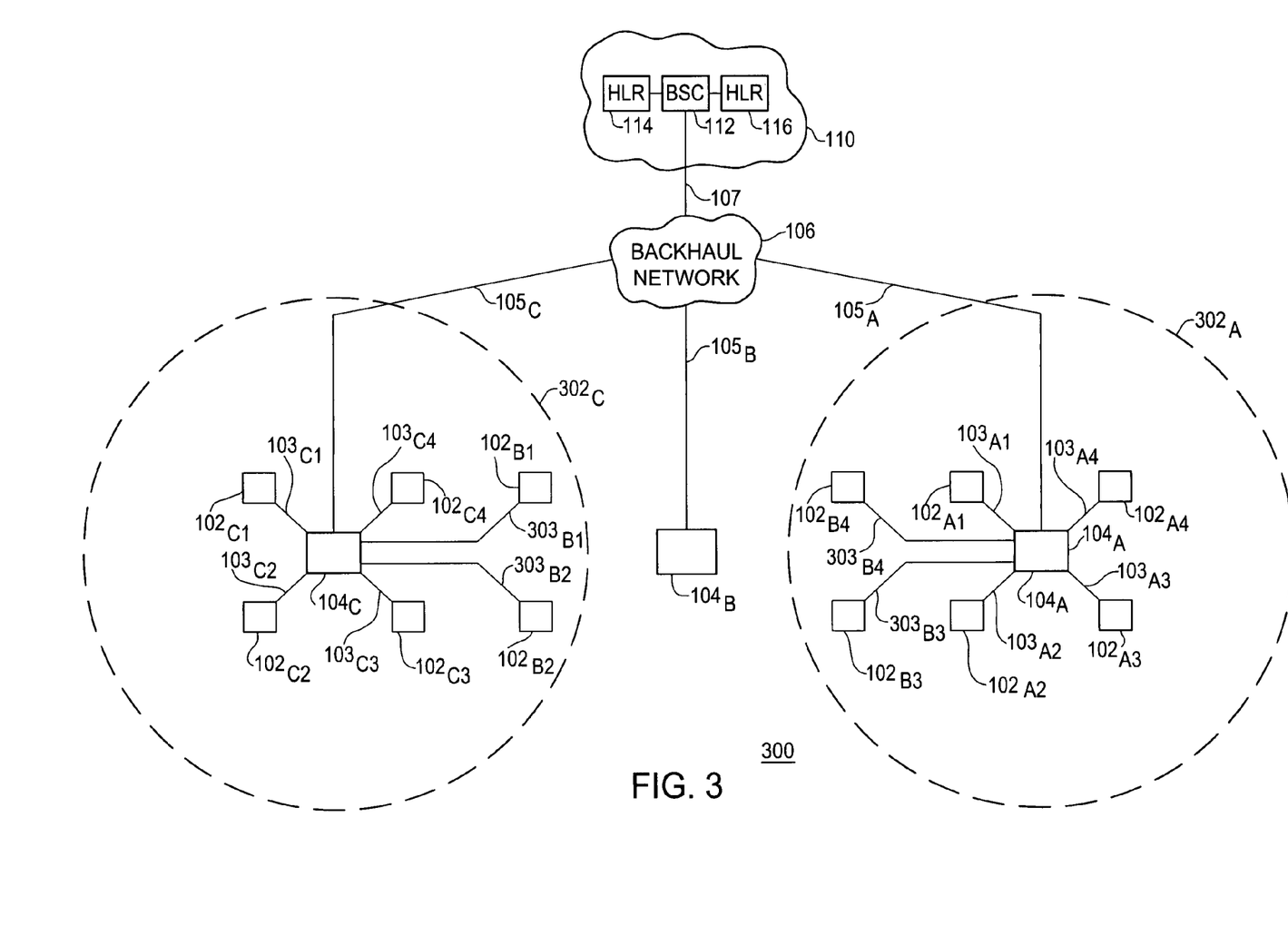
FIG. 3 depicts a high-level block diagram of a BSR-based portion of the communications network of FIG. 1 after a failure condition.

FIG. 3 depicts a high-level block diagram of a BSR-based portion of the communications network of FIG. 1 after a failure condition. Specifically, BSR-based portion 300 of FIG. 3 includes WTs 102, BSRs 104, BN 106, and AN 110. As depicted in FIG. 3, a failure condition on BSR $104_B$ impacting the wireless communication portion of BSR $104_B$ terminates WSCA $202_B$ such that WTs $102_B$ previously served by BSR $104_B$ cannot be served by BSR $104_B$. In response to the failure condition, BSR $104_B$ generates a failure indication message adapted for triggering reconfiguration of adjacent base station elements (illustratively, BSRs $104_A$ and $104_C$) to support wireless terminals previously supported by BSR $104_B$ (illustratively, WTs $102_B$).

As depicted in FIG. 3, BSRs $104_A$ and $104_C$ are reconfigured by increasing respective power levels employed by BSRs $104_A$ and $104_C$ in a manner for expanding associated WSCAs $202_A$ and $202_C$ (depicted in FIG. 2) to form WSCAs $302_A$ and $302_B$ (depicted in FIG. 3). As such, WSCAs $302_A$ and $302_C$ of FIG. 3 replace WSCAs $202_A$, $202_B$, and $202_C$ of FIG. 2. As depicted in FIG. 3, the increased power level employed by BSR $104_A$ expands WSCA $202_A$ to form WSCA $302_A$ which includes WTs $102_{B3}$ and $102_{B4}$, and the increased power level employed by BSR $104_C$ expands WSCA $202_C$ to form WSCA $302_C$ which includes WTs $102_{B1}$ and $102_{B2}$.

As depicted in FIG. 3, WTs $102_{B3}$ and $102_{B4}$ (previously served by BSR $104_B$) transition to being served by BSC $104_A$ using wireless communication links (WCLs) $303_{B3}$ and $303_{B4}$, respectively. As depicted in FIG. 3, WTs $102_{B1}$ and $102_{B2}$ (previously served by BSR $104_B$) transition to being served by BSC $104_C$ using wireless communication links (WCLs) $303_{B1}$ and $303_{B2}$, respectively. Although depicted and described as using power level increases for reconfiguration of base station elements (illustratively, for reconfiguring BSR $104_B$) in response to failure conditions, reconfiguration of base station elements may be performed using various other reconfiguration solutions.

Figure 4:
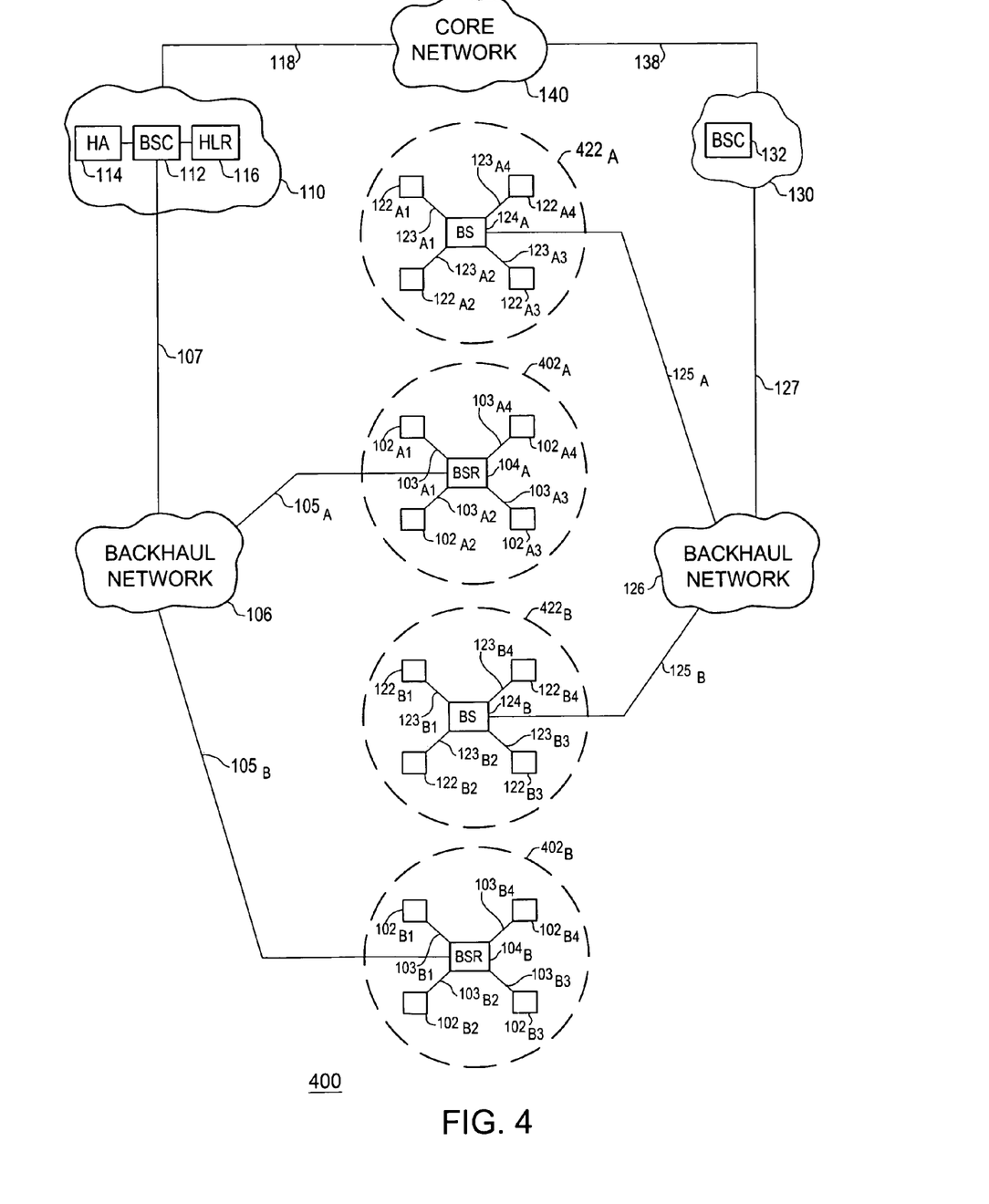
FIG. 4 depicts a high-level block diagram of a BSR-based portion and a BS-based portion of the communications network of FIG. 1 before a failure condition.

FIG. 4 depicts a high-level block diagram of a BSR-based portion and a BS-based portion of the communications network of FIG. 1 before a failure condition. Specifically, network portion 400 of FIG. 4 includes a BSR-based portion (including WTs 102, BSRs 104, BN 106, and AN 110) and a BS-based portion (including WTs 122, BSs 124, BN 126, and AN 130). As depicted in FIG. 4, BSRs $104_A$ and $104_B$ have an associated plurality of wireless service coverage areas (WSCAs) $402_A$ and $402_B$ (collectively, WSCAs 402), respectively, and BSs $124_A$ and $124_B$ have an associated plurality of wireless service coverage areas (WSCAs) $422_A$ and $422_B$ (collectively, WSCAs 422), respectively.

As depicted in FIG. 4, WTs $102_A$ located within WSCA $402_A$ are served by BSR $104_A$, WTs $102_B$ located within WSCA $402_B$ are served by BSR $104_B$, WTs $122_A$ located within WSCA $422_A$ are served by BS $124_A$, and WTs $122_B$ located within WSCA $422_B$ are served by BS $124_B$. In one embodiment of the present invention, BSRs 104 may be reconfigured in response to failure conditions associated with BSs 124, as depicted and described herein with respect to FIG. 5. In one embodiment of the present invention, BSs 124 may be reconfigured in response to failure conditions associated with BSRs 104, as depicted and described herein with respect to FIG. 6.

Figure 5:
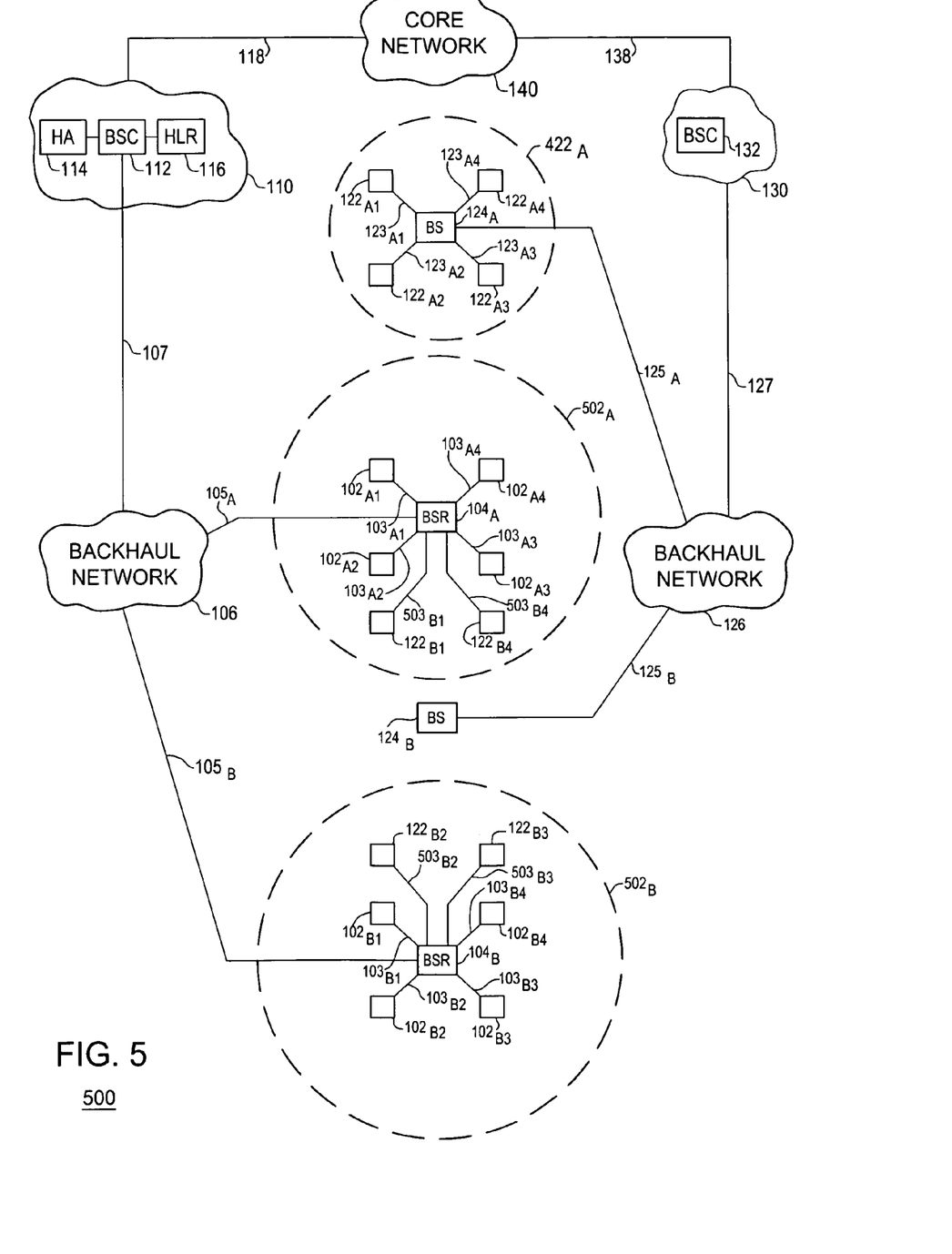
FIG. 5 depicts a high-level block diagram of a BSR-based portion and a BS-based portion of the communications network of FIG. 1 after a failure condition in the BS-based portion of the communications network of FIG. 1.

FIG. 5 depicts a high-level block diagram of a BSR-based portion and a BS-based portion of the communications network of FIG. 1 after a failure condition in the BS-based portion of the communications network of FIG. 1. As depicted in FIG. 5, a failure condition on BS $124_B$ impacting the wireless communication portion of BS $124_B$ terminates WSCA $422_B$ such that WTs $122_B$ previously served by BS $124_B$ cannot be served by BS $124_B$. In response to the failure condition, BS $124_B$ generates a failure indication message adapted for triggering reconfiguration of adjacent base station elements (illustratively, BSRs $104_A$ and $104_B$) to support any customers previously supported by BS $124_B$ (illustratively, WTs $122_B$).

As depicted in FIG. 5, BSRs $104_A$ and $104_B$ are reconfigured by increasing respective power levels employed by BSRs $104_A$ and $104_B$ in a manner for expanding associated WSCAs $402_A$ and $402_B$ (depicted in FIG. 4) to form WSCAs $502_A$ and $502_B$ (depicted in FIG. 5). As such, WSCAs $502_A$ and $502_B$ of FIG. 5 replace WSCAs $402_A$, $402_B$, and $422_B$ of FIG. 4. As depicted in FIG. 5, the increased power level employed by BSR $104_A$ expands WSCA $402_A$ to form WSCA $402_A$ which includes WTs $122_{B1}$ and $122_{B2}$, and the increased power level employed by BSR $104_B$ expands WSCA $402_B$ to form WSCA $502_B$ which includes WTs $122_{B3}$ and $122_{B4}$.

As depicted in FIG. 5, WTs $122_{B1}$ and $122_{B2}$ (previously served by BS $124_B$) transition to being served by BSC $104_A$ using wireless communication links (WCLs) $503_{B1}$ and $503_{B2}$, respectively. As depicted in FIG. 5, WTs $122_{B3}$ and $122_{B4}$ (previously served by BS $124_B$) transition to being served by BSC $104_B$ using wireless communication links (WCLs) $503_{B3}$ and $503_{B4}$, respectively. Although depicted and described as using power level increases for reconfiguration of base station elements (illustratively, for reconfiguring BSRs $104_A$ and $104_B$) in response to failure conditions, reconfiguration of base station elements may be performed using various other reconfiguration solutions.

Figure 6:
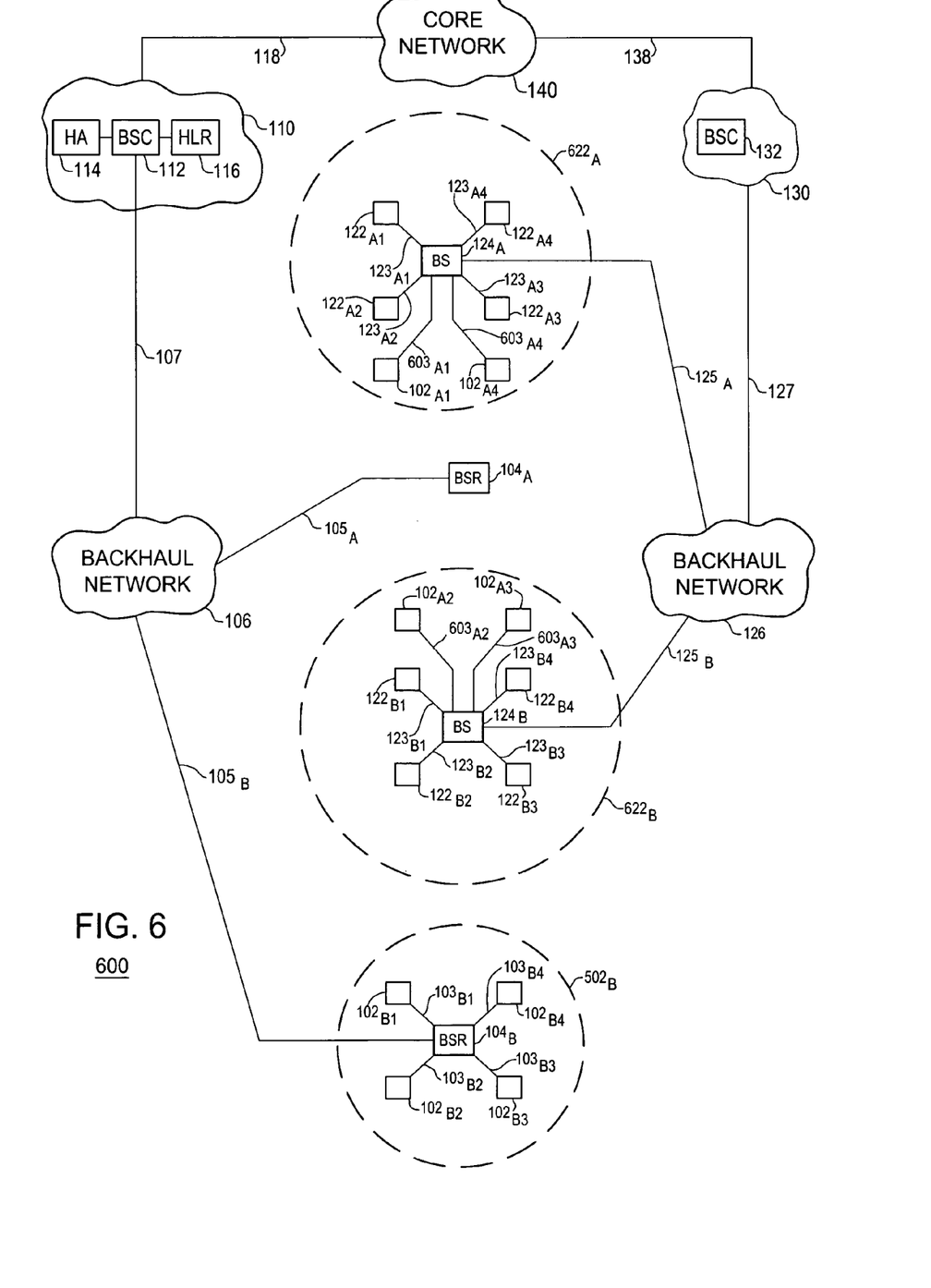
FIG. 6 depicts a high-level block diagram of a BSR-based portion and a BS-based portion of the communications network of FIG. 1 after a failure condition in the BSR-based portion of the communications network of FIG. 1.

FIG. 6 depicts a high-level block diagram of a BSR-based portion and a BS-based portion of the communications network of FIG. 1 after a failure condition in the BSR-based portion of the communications network of FIG. 1. As depicted in FIG. 6, a failure condition on BSR $104_A$ impacting the wireless communication portion of BSR $104_A$ terminates WSCA $402_A$ such that WTs $102_A$ previously served by BSR $104_A$ cannot be served by BSR $104_A$. In response to the failure condition, BSR $104_A$ generates a failure indication message adapted for triggering reconfiguration of adjacent base station elements (illustratively, BSs $124_A$ and $124_B$) to support any customers previously supported by BSR $104_A$ (illustratively, WTs $102_A$).

As depicted in FIG. 6, BSs $124_A$ and $124_B$ are reconfigured by increasing respective power levels employed by BSs $124_A$ and $124_B$ in a manner for expanding associated WSCAs $422_A$ and $422_B$ (depicted in FIG. 4) to form WSCAs $622_A$ and $622_B$ (depicted in FIG. 6). As such, WSCAs $622_A$ and $622_B$ of FIG. 6 replace WSCAs $422_A$, $422_B$, and $402_A$ of FIG. 4. As depicted in FIG. 6, the increased power level employed by BS $124_A$ expands WSCA $422_A$ to form WSCA $622_A$ which includes WTs $102_{A1}$ and $102_{A4}$, and the increased power level employed by BS $124_B$ expands WSCA $422_B$ to form WSCA $622_B$ which includes WTs $102_{A2}$ and $102_{A3}$.

As depicted in FIG. 6, WTs $102_{A1}$ and $102_{A4}$ (previously served by BSR $104_A$) transition to being served by BS $124_A$ using wireless communication links (WCLs) $603_{A1}$ and $603_{A4}$, respectively. As depicted in FIG. 6, WTs $102_{A2}$ and $102_{A3}$ (previously served by BSR $104_A$) transition to being served by BS $124_B$ using wireless communication links (WCLs) $603_{A2}$ and $603_{A3}$, respectively. Although depicted and described as using power level increases for reconfiguration of base station elements (illustratively, for reconfiguring BSs $124_A$ and $124_B$) in response to failure conditions, reconfiguration of base station elements may be performed using various other reconfiguration solutions.

In one embodiment of the present invention, the BSR-based network portion deployed overlaying the BS-based network portion may be reconfigured to provide service to wireless terminals previously served by the BS-based network portion. In one embodiment of the present invention, the BS-based network portion supporting the BSR-based network portion may be reconfigured to provide service to wireless terminals previously served by the BSR-based network portion. As such, base station element reconfiguration may be performed in a wireless network irrespective of wireless network (e.g., wireless network type, wireless network configuration, and the like), base station element type, and various other technology-specific networks, network elements, protocols, and the like.

Figure 7:
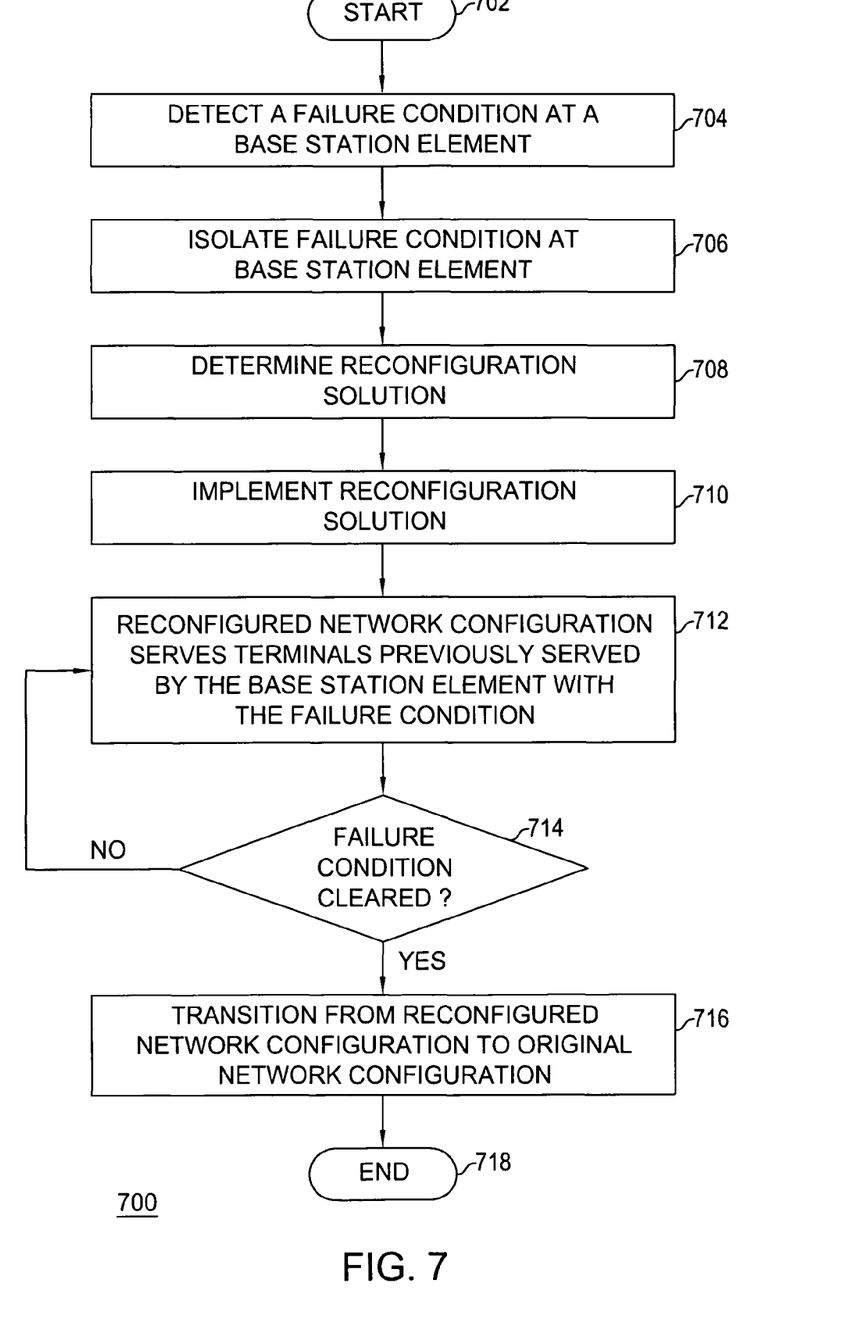
FIG. 7 depicts a method according to one embodiment of the invention.

FIG. 7 depicts a method according to one embodiment of the invention. Specifically, method 700 of FIG. 7 includes a method for reconfiguring a wireless network (i.e., reconfiguring at least one base station element) in response to detection of a failure condition at a base station element. Although depicted as being performed serially, those skilled in the art will appreciate that at least a portion of the steps of method 700 may be performed contemporaneously, or in a different order than presented in FIG. 7. The method 700 begins at step 702 and proceeds to step 704.

At step 704, a failure condition is detected at a base station element. In one embodiment, the failure condition is detected by the base station element on which the failure condition occurs using at least one failure detection module. In one embodiment, the failure condition may be detected by a base station controller or other network element in communication with the base station element on which the failure condition occurs (e.g., by detecting an interruption in data flow from the base station element on which the failure condition occurs). The failure condition may be associated with a hardware component, a firmware component, a software component, and the like, as well as various combinations thereof. The failure condition may be associated with a wireless communication portion of a base station element, a wireline communication portion of a base station element, as well as various combinations thereof.

At step 706, the failure condition is isolated on the base station element on which the failure condition occurred. In an embodiment in which the failure condition occurred in a wireless communication portion of the base station element, the base station may isolate the failure condition to the wireless communication portion such that the wireline communication portion of the base station element may be used for reconfiguring at least one other base station element. In an embodiment in which the failure condition occurred in a wireline communication portion of the base station element, the base station may isolate the failure condition to the wireline communication portion such that the wireless communication portion of the base station element may be used for reconfiguring at least one other base station element.

At step 708, a reconfiguration solution is determined. In one embodiment, the reconfiguration solution includes at least one reconfiguration action associated with each base station element reconfigurable for serving at least a portion of the wireless terminals previously served by the base station element on which the failure condition occurred. As described herein, in one embodiment, the reconfiguration solution depends on the respective geographical locations of the base station elements. A method for determining a reconfiguration solution is depicted and described herein with respect to FIG. 8. At step 710, the reconfiguration solution is implemented (i.e., at least one base station element is reconfigured to serve at least a portion of the wireless terminals previously served by the base station element on which the failure condition occurred).

At step 712, the reconfigured base station elements serve at least a portion of the wireless terminals previously served by the base station element with the failure condition. At step 714, a determination is made as to whether or not the failure condition is cleared. If the failure condition is not cleared, method 700 returns to step 712, and the reconfigured base station elements continue serving at least a portion of the wireless terminals previously served by the base station element with the failure condition. If the failure condition is cleared, method 700 proceeds to step 716. At step 716, the network transitions from the reconfigured network configuration to the original network configuration (i.e., base station elements reconfigured according to the reconfiguration solution revert to the original configurations). The method 700 then proceeds to step 718, where method 700 ends.

Figure 8:
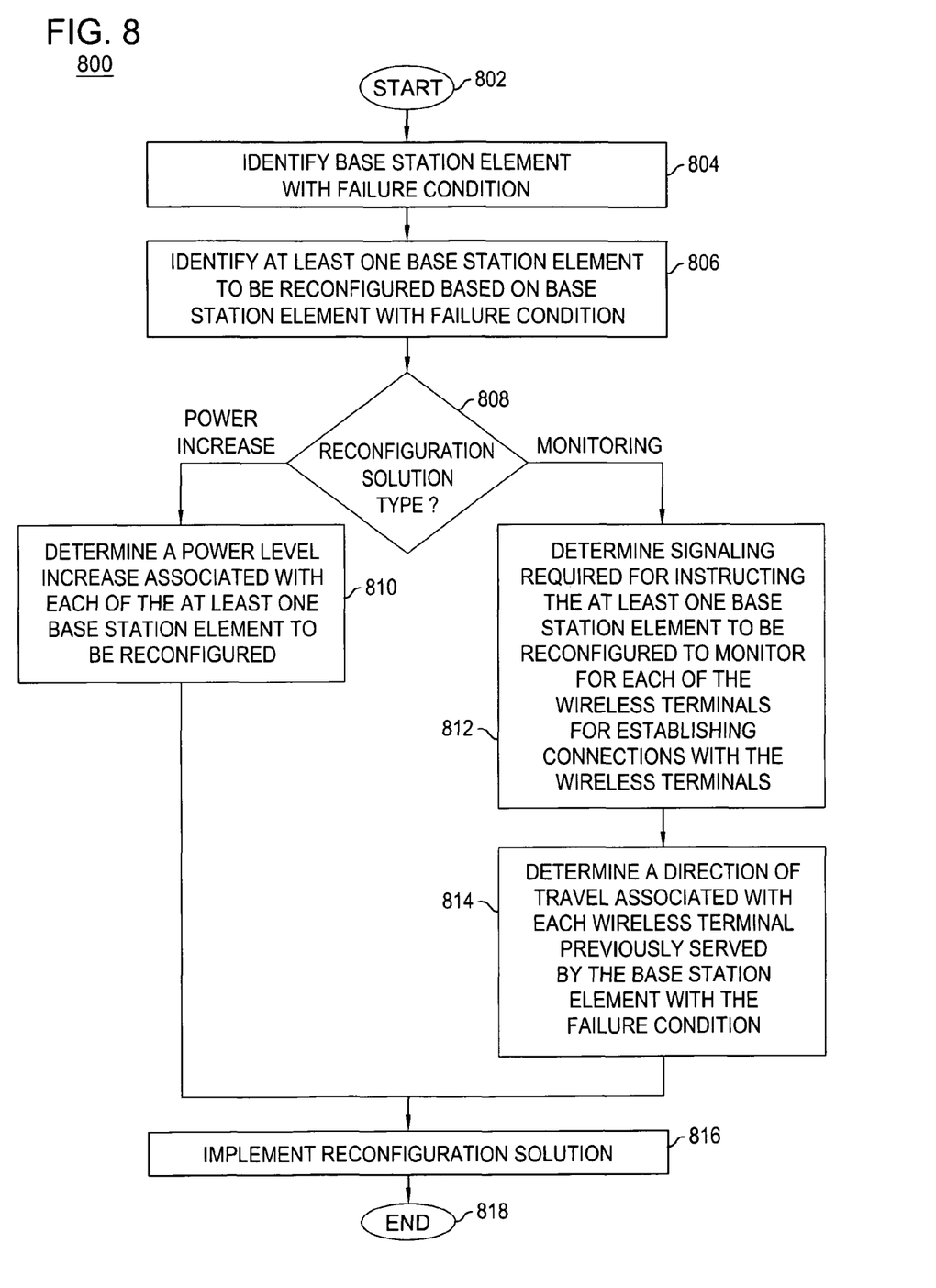
FIG. 8 depicts a method according to one embodiment of the invention.

FIG. 8 depicts a method according to one embodiment of the invention. Specifically, method 800 of FIG. 8 includes a method for determining a reconfiguration solution. Although method 800 of FIG. 8 includes a method for determining two different reconfiguration solutions, method 800 of FIG. 8 may be adapted for determining fewer or less reconfiguration solutions, as well as reconfiguration solutions different than the reconfiguration solutions depicted and described with respect to FIG. 8. Although depicted as being performed serially, those skilled in the art will appreciate that at least a portion of the steps of method 800 may be performed contemporaneously, or in a different order than presented in FIG. 8. The method 800 begins at step 802 and proceeds to step 804.

At step 804, the base station element with the failure condition is identified. Although primarily described herein as being identified using a failure indication message generated in transmitted by the base station element with the failure condition, various other methods of identifying the base station element with the failure condition may be employed. For example, in one embodiment, a management system in communication with each of the base station elements may periodically poll each of the base station elements for determining whether any of the base station elements have associated failure conditions. For example, in another embodiment, each base station element may periodically poll adjacent station elements for determining whether any of the adjacent base station elements have associated failure conditions.

At step 806, at least one base station element to be reconfigured is identified. The at least one base station element to be reconfigured is identified based on the base station element with the failure condition. In one embodiment, for example, following identification of a base station element on which a failure condition is detected, all other base stations within a predetermined geographical distance of the base station element on which a failure condition is detected may be identified as base station elements to be reconfigured in response to the failure condition. In one such embodiment, additional parameters (e.g., base station element type, base station element capacity, and the like) may be evaluated for identifying the at least one base station element to be reconfigured in response to the failure condition.

At step 808, a determination is made as to the type of reconfiguration solution to be applied in response to detection of a failure condition on a base station element. If the reconfiguration solution type is a power level increase solution (i.e., a solution in which a power level employed by a base station element, or multiple base station elements, adjacent to the base station element with the failure condition is increased for increasing the wireless service coverage area of the reconfigured base station element), method 800 proceeds to step 810. If the reconfiguration solution type is a monitoring solution (i.e., a solution in which a base station is reconfigured to monitor for wireless terminals previously served by the base station element with the failure condition), method 800 proceeds to step 812.

In one embodiment, the reconfiguration solution type may be predetermined. In this embodiment, each base station element in the network may be preconfigured to use a particular reconfiguration solution. In another embodiment, the reconfiguration solution may be dynamically determined on-the-fly. In one such embodiment, the reconfiguration solution may be determined according to a failure condition type. For example, a first failure condition type may result in a determination that a power level increase solution should be applied in response to the first failure condition while a second failure condition type may result in a determination that a monitoring solution should be applied in response to the second failure condition. In another such embodiment, the reconfiguration solution may be determined according to one or more parameters associated with each of the wireless terminals previously served by the base station element on which the failure condition is detected.

At step 810, a power level increase is determined for each of the at least one base station element to be reconfigured. The method 800 then proceeds to step 814. At step 812, signaling is determined, where the signaling is required for instructing the at least one base station element to be reconfigured to monitor for each wireless terminal previously served by the base station element with the failure condition. The at least one reconfigured base station element monitors for each wireless terminal previously served by the base station element with the failure condition for determining whether to establish a connection with the wireless terminals. The method 800 then proceeds to step 814. At step 814, the reconfiguration solution is implemented. The method 800 then proceeds to step 816, where method 800 ends.

As described herein, in one embodiment, a reconfiguration solution includes increasing power levels associated with active BSEs adjacent to the BSE with the failure condition. In this embodiment, power levels associated with active BSEs adjacent to the BSE with the failure condition are increased such that the wireless service coverage areas of the active BSEs cover at least a portion of the wireless service coverage area previously covered by the BSE with the failure condition. In one such embodiment, each BSE maintains a reconfiguration table including power level increases associated with each possible combination of BSE failures. For example, with respect to FIG. 2, BSR 104$_A$ may maintain a reconfiguration table indicating a fifty percent power level increase during a failure condition on BSR 104$_B$ (without a failure condition on BSR 102$_C$), a zero percent power level increase during a failure condition on BSR 104$_C$ (without a failure condition on BSR 102$_B$), and a sixty percent power level increase during simultaneous failure conditions on BSRs 102$_B$ and 102$_C$.

As described herein, in one embodiment, a reconfiguration solution includes monitoring WTs associated with a BSR with a failure condition. In one such embodiment, a direction of travel associated with each of the plurality of WTs associated with the BSR with the failure condition is determined, and a connection is established between the active BSR and each of the plurality of WTs for which the determined direction of travel is toward the active BSR. For example, with respect to FIG. 2, in response to detection of a failure condition on BSR 104$_B$, BSR 104$_B$ may signal BSR 104$_A$ and BSR 104$_C$ to monitor for WTs 102$_B$. Upon detecting that WTs 102$_{B1}$ and 102$_{B2}$ are moving toward BSR 104$_C$, BSR 104$_C$ may initiate signaling required for establishing a connection with WTs 102$_{B1}$ and 102$_{B2}$. Similarly, upon detecting that WTs 102$_{B3}$ and 102$_{B4}$ are moving toward BSR 104$_A$, BSR 104$_A$ may initiate signaling required for establishing a connection with WTs 102$_{B3}$ and 102$_{B4}$.

Although specific reconfiguration solutions are described herein, reconfiguration of an active BSE in response to a failure condition on a BSE with a failure condition may be performed using any reconfiguration solution. As described herein, reconfiguration solutions may be predetermined or dynamically determined on-the-fly. Furthermore, reconfiguration solutions may be determined by any network element or combination of network elements in communication with the wireless network, including a base station element with the failure condition, active base station elements, base station controllers, network management systems, and the like, as well as various combinations thereof.

In one embodiment, reconfiguration solutions are predetermined. In one embodiment, predetermined solutions are stored within the network. In one embodiment, reconfiguration solutions may be stored on each of the base station elements. In another embodiment, reconfiguration solutions may be stored on base station controllers. In such embodiments, a plurality of reconfiguration solutions associated with a respective plurality of failure scenarios (e.g., contemporaneous failures of a plurality of base station element) may be stored on each network element (e.g., on each base station element, on each base station controller, and the like). In one embodiment, predetermined reconfiguration solutions may be determined using any of a plurality of radio coverage planning tools.

In one embodiment, reconfiguration solutions are dynamically determined on-the-fly. In one such embodiment, reconfiguration solutions are determined on-the-fly by base station elements with the failure condition in response to detecting a failure condition. In another such embodiment, reconfiguration solutions are determined on-the-fly by base station controllers in response to failure indication messages from base station elements with failure conditions. In another such embodiment, reconfiguration solutions are determined on-the-fly by active base station elements in response to failure indication messages from base station elements with failure conditions. In one embodiment, reconfiguration solutions may be determined on-the-fly using any of a plurality of radio coverage planning tools.

In one embodiment, the reconfiguration solution is determined by the BSR with the failure condition. In one such embodiment, the reconfiguration solution generated by the BSR with the failure condition is transmitted by the BSR with the failure condition to the active BSRs identified in the reconfiguration solution. In another such embodiment, the reconfiguration solution generated by the BSR with the failure condition is transmitted by the BSR with the failure condition to a BSC associated with the BSR with the failure condition. In this embodiment, the BSC transmits the reconfiguration solution to the active BSRs identified in the reconfiguration solution. In such embodiments, the active BSRs receive and implement the reconfiguration solution.

In one embodiment, the reconfiguration solution is determined by the active BSRs. In one embodiment, the BSR with the failure condition generates a plurality of failure indication messages. In one such embodiment, the BSR with the failure condition broadcasts the failure indication message to the active BSRs. In another such embodiment, the BSR with the failure condition transmits the failure indication message to a targeted set of active BSRs (i.e., to active BSRs adjacent the BSR with the failure condition). In such embodiments, active BSRs receiving the failure indication messages implement the reconfiguration solution in response to the failure indication messages.

In one embodiment, the reconfiguration solution is determined by the active BSRs. In one embodiment, the BSR with the failure condition generates a failure indication message. In this embodiment, the BSR with the failure condition transmits the failure indication message to a BSC associated with the BSR with the failure condition. In one such embodiment, the BSC broadcasts the failure indication message to the active BSRs. In another such embodiment, the BCS transmits the failure indication message to a targeted set of active BSRs (i.e., to active BSRs adjacent the BSR with the failure condition). In such embodiments, active BSRs receiving the failure indication messages implement the reconfiguration solution in response to the failure indication messages.

In one embodiment, the reconfiguration solution is determined by a BCS. In this embodiment, the BSR with the failure condition generates a failure indication message, and transmits the failure indication message to a BSC associated with the BSR with the failure condition. The BSC determines the reconfiguration solution in response to the failure indication message. The BCS identifies active BSRs associated with the reconfiguration solution, and generates reconfiguration messages for the active BSRs. The BSC transmits the reconfiguration messages to the active BSRs. In such embodiments, active BSRs receiving the reconfiguration messages implement the reconfiguration solution in response to the reconfiguration messages.

In one embodiment, a reconfiguration solution adapted for reconfiguring a base station element depends on geographical location. In one such embodiment, the reconfiguration solution depends on the geographical location of the base station element on which the failure condition is detected, as well as the geographical locations of other base station elements reconfigured in response to detection of the failure condition. In one such embodiment, for example, in which the reconfiguration solution includes increasing a power level associated with one or more base station elements, portions of the reconfiguration solution may depend on the geographical locations.

For example, the base station elements selected for being reconfigured, and amount of increase in the power level of each of the base station elements selected for being reconfigured, may depend on the geographical locations of the base station elements. For example, base station elements adjacent to the base station element on which the failure condition is detected may be selected for being reconfigured, and the amount of increase in distance between the base station elements may be directly proportional to the respective distances between the base station element on which the failure condition is detected and the base station elements selected for being reconfigured.

Although described herein with respect to specific implementations, a reconfiguration solution of the present invention may be determined by various other network elements (in addition to BSRs with failure conditions, BSCs, and active BSRs). Although described herein with respect to specific implementations, signaling required for communicating failure conditions and associated reconfiguration solutions may be performed by various other network elements (in addition to BSRs with the failure conditions, BSCs, and active BSRs). As such, reconfiguration functions (e.g., failure notification signaling functions, reconfiguration solution determination functions, reconfiguration solution signaling functions, reconfiguration implementation functions, and the like) of the present invention are not intended to be limited to specific networks, network elements, protocols, and the like.

Although primarily described herein with respect to using a wireline communication portion (e.g., module) of a base station element for notifying at least one other base station element of a failure of a wireless communication portion (e.g., module) of the base station element, the present invention may be used in various other configurations. In one embodiment, the wireless communication portion of the base station element may be used for notifying at least one other base station element of a failure of the wireline communication portion of the base station element. In other embodiments, the wireline communication portion of the base station element may be used for notifying at least one other base station element of a failure of a portion of the wireline communication portion of the base station element, the wireless communication portion of the base station element may be used for notifying at least one other base station element of a failure of a portion of the wireless communication portion of the base station element, and the like.

Although primarily described with respect to detection of a failure condition by the base station element on which the failure condition occurs, in one embodiment, detection of a failure condition may be performed by at least one other network element (e.g., base station element, base station controller, and the like) in communication with the base station element on which the failure condition occurs. In one example, each base station element may periodically send "I AM ALIVE" messages to each neighbor base station element such that if an "I AM ALIVE" message is not received for a threshold length of time, the neighbor base station elements assume a failure condition has occurred. In another example, each base station element may periodically poll each neighbor base station element for determining if a failure condition has occurred on any of the neighbor base station elements. Although specific examples have been described, various other methods for detecting failure conditions may be used.

Figure 9:
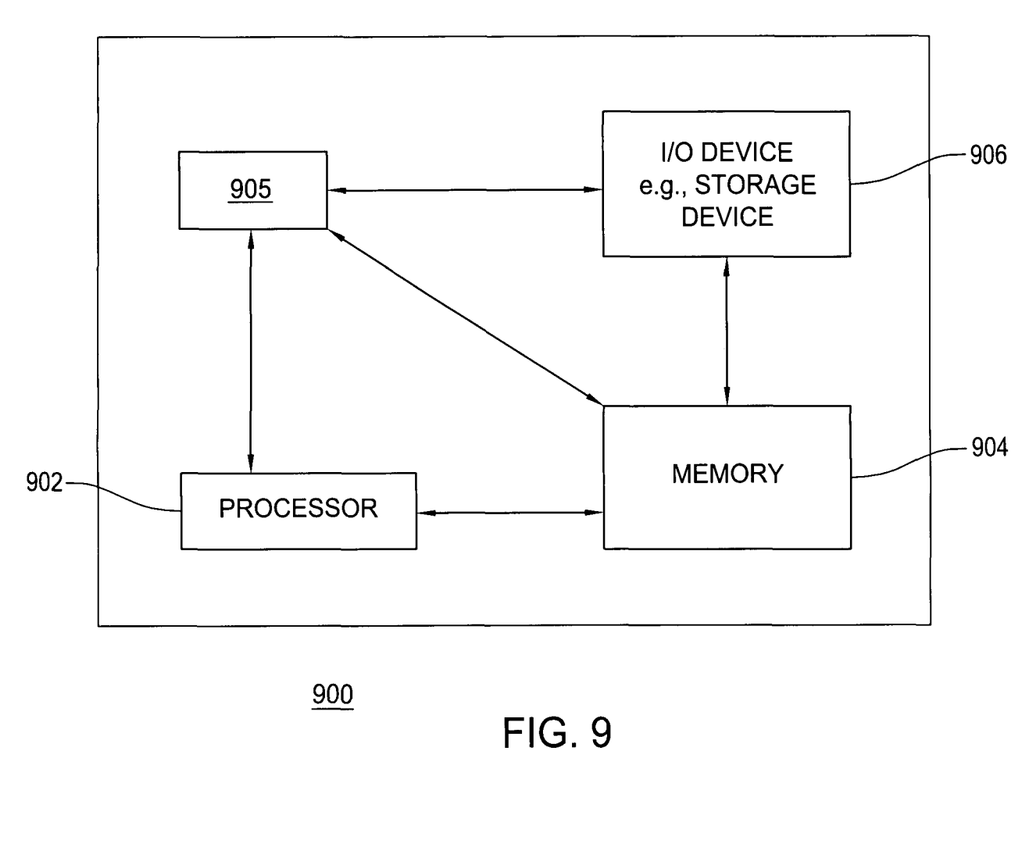
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 includes a processor element 902 (e.g., a CPU), a memory 904, e.g., random access memory (RAM) and/or read only memory (ROM), a reconfiguration module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the reconfiguration module or process 905 can be loaded into memory 904 and executed by processor 902 to implement the functions discussed herein. As such, reconfiguration process 905 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method, comprising:
    at a base station element, in response to an indication of a failure condition associated with another base station element serving a plurality of wireless terminals, performing a self-reconfiguration according to a reconfiguration solution;
    said reconfiguration solution adapted to reconfigure the base station element to serve a portion of the plurality of wireless terminals, wherein the reconfiguration solution depends on a type of the failure condition;
    at the base station element, upon completion of the self-reconfiguration, initiating communication with each of the portion of wireless terminals to provide thereby a respective continuity of service.

2. The method of claim 1, further comprising:
    at the base station element, upon determining that the failure condition has been cleared on the other base station element, restoring an original configuration of the base station element.

3. The method of claim 1, wherein the reconfiguration solution is pre-determined prior to the occurrence of the failure condition.

4. The method of claim 1, wherein the reconfiguration solution includes increasing a power level employed by the base station element to thereby expand a wireless coverage area of the base station element.

5. The method of claim 1, wherein the reconfiguration solution comprises:
    monitoring each of the plurality of wireless terminals for determining a direction of travel associated with each of the plurality of wireless terminals; and
    selecting as said portion of the plurality of wireless terminals those wireless terminals for which the respective direction of travel is toward the base station element.

6. The method of claim 1, wherein the failure condition at the other base station element is detected by the base station element.

7. The method of claim 6, wherein the base station element detects a failure at the other base station element by detecting an interruption in data flow from the other base station element.

8. The method of claim 1, wherein the indication of a failure condition is received from at least one of the other base station element and a base station controller.

9. The method of claim 8, wherein a failure indication associated with a wireless communication portion of the other base station element is received by the base station controller via a wireline connection to the other base station element.

10. The method of claim 8, wherein a failure indication associated with a wireline communication portion of the other base station element is received by the base station controller via a wireless connection to the other base station element.

11. The method of claim 1, wherein the method is adapted for use at each of a plurality of base station elements within a network, each base station element being associated with at least one other base station element.

12. The method of claim 1, wherein the indication of a failure condition is received at the base station element via a communication channel associated with one of the other base station element and a network management system.

13. The method of claim 1, wherein said base station element is associated with a plurality of other base station elements, said method further comprising:
    at said base station, periodically polling said plurality of other base station elements to determine thereby whether a failure conditions exists.

14. A base station element comprising a processor configured for:
    at the base station element, in response to an indication of a failure condition associated with another base station element serving a plurality of wireless terminals, performing a self-reconfiguration according to a reconfiguration solution;
    said reconfiguration solution adapted to reconfigure the base station element to serve a portion of the plurality of wireless terminals, wherein the reconfiguration solution depends on a type of the failure condition;

at the base station element, upon completion of the self-reconfiguration, initiating communication with each of the portion of wireless terminals to provide thereby a respective continuity of service.

15. The base station element of claim 14, wherein the self-reconfiguration comprises increasing a power level employed by the base station element for expanding a wireless coverage area of the base station element.

16. The base station element of claim 14, wherein the self-reconfiguration comprises:
   monitoring each of the plurality of wireless terminals for determining a direction of travel associated with each of the plurality of wireless terminals; and
   selecting as said portion of the plurality of wireless terminals those wireless terminals for which the respective direction of travel is toward the base station element.

17. The base station element of claim 14, wherein the base station element detects a failure at the other base station element by detecting an interruption in data flow from the other base station element.

18. The base station element of claim 14, wherein the indication of a failure condition is received at the base station element via a communication channel associated with one of the other base station element and a network management system.

19. A tangible and non-transient computer readable storage medium storing instructions which, when executed by a computer, adapt the operation of the computer to provide a method, comprising:
   at a base station element, in response to an indication of a failure condition associated with another base station element serving a plurality of wireless terminals, performing a self-reconfiguration according to a reconfiguration solution;
   said reconfiguration solution adapted to reconfigure the base station element to serve a portion of the plurality of wireless terminals, wherein the reconfiguration solution depends on a type of the failure condition;
   at the base station element, upon completion of the self-reconfiguration, initiating communication with each of the portion of wireless terminals to provide thereby a respective continuity of service.

20. A computer program product wherein computer instructions, when executed by a processor in a base station element, adapt the operation of the base station element to provide a method, comprising:
   at a base station element, in response to an indication of a failure condition associated with another base station element serving a plurality of wireless terminals, performing a self-reconfiguration according to a reconfiguration solution;
   said reconfiguration solution adapted to reconfigure the base station element to serve a portion of the plurality of wireless terminals, wherein the reconfiguration solution depends on a type of the failure condition;
   at the base station element, upon completion of the self-reconfiguration, initiating communication with each of the portion of wireless terminals to provide thereby a respective continuity of service.

* * * * *